United States Patent
Lotter

(10) Patent No.: US 12,389,202 B2
(45) Date of Patent: *Aug. 12, 2025

(54) IN-BUILDING TRACKING SYSTEM FOR DISTRIBUTED ANTENNA SYSTEMS

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,848

(22) Filed: May 29, 2024

(65) Prior Publication Data

US 2024/0314520 A1    Sep. 19, 2024

Related U.S. Application Data

(63) Continuation of application No. 17/403,591, filed on Aug. 16, 2021, now Pat. No. 12,004,044, which is a
(Continued)

(51) Int. Cl.
*G08B 1/08*   (2006.01)
*G08B 21/02*  (2006.01)
(Continued)

(52) U.S. Cl.
CPC ............ *H04W 4/029* (2018.02); *G08B 21/02* (2013.01); *H04B 17/27* (2015.01); *H04B 17/318* (2015.01); *H04W 4/33* (2018.02)

(58) Field of Classification Search
CPC ........ H04W 4/029; H04W 4/33; G08B 21/02; G08B 25/016; H04B 17/27; H04B 17/318;
(Continued)

(56) References Cited

U.S. PATENT DOCUMENTS 6,034,622 A    3/2000  Levine
6,965,344 B1  11/2005  Halsey et al.
(Continued)

FOREIGN PATENT DOCUMENTS

EP    2928243 A1    7/2015

OTHER PUBLICATIONS

European Patent Office; "Extended European Search Report" dated Feb. 22, 2022; EPO Patent Application No. 19819481.3; pp. 1-8 (2022).
(Continued)

*Primary Examiner* — Anh V La
(74) *Attorney, Agent, or Firm* — FisherBroyles LLP; James P. Cleary

(57) ABSTRACT

A system and method for determining a position of a first responder in a building, where the first responder is using a radio, and using a distributed antenna system. Each antenna has a level detector to detect and measure a strength of an input signal from the radio of the first responder to produce a level signal, a time tagger to tag the detected input signal with a timing signal, and a communication module to transmit the level signal and timing signal. A sensor processor connected with a signal distribution network is configured to receive the signal level and timing signal from the signal distribution network of each of the plurality of antennas, to determine the position of the radio relative to each of the plurality of antennas according to the level signal and timing signal.

6 Claims, 4 Drawing Sheets

Related U.S. Application Data continuation of application No. 17/071,413, filed on Oct. 15, 2020, now Pat. No. 11,096,014, which is a continuation of application No. 16/442,376, filed on Jun. 14, 2019, now Pat. No. 10,812,939.

(60) Provisional application No. 62/684,978, filed on Jun. 14, 2018.

(51) Int. Cl.
   *H04B 17/27* (2015.01)
   *H04B 17/318* (2015.01)
   *H04W 4/029* (2018.01)
   *H04W 4/33* (2018.01)

(58) Field of Classification Search
   CPC ........ G01S 5/02216; G01S 5/14; G01S 11/06; G01S 2205/06
   USPC ........ 340/539.13, 539.2, 539.11, 539.1, 540, 340/686.1, 686.6, 686.2
   See application file for complete search history.

(56) References Cited

U.S. PATENT DOCUMENTS

| | | |
|---|---|---|
| 7,126,951 B2 | 10/2006 | Belcea et al. |
| 7,346,336 B2 | 3/2008 | Kampel et al. |
| 9,980,112 B1 | 5/2018 | Newby et al. |
| 10,812,939 B2 | 10/2020 | Lotter |
| 11,096,014 B2 | 8/2021 | Lotter |
| 12,004,044 B2 * | 6/2024 | Lotter .................. H04W 4/029 |
| 2004/0246926 A1 | 12/2004 | Belcea et al. |
| 2006/0125630 A1 | 6/2006 | Parkulo |
| 2009/0043504 A1 | 2/2009 | Bandyopadhyay et al. |
| 2010/0280796 A1 | 11/2010 | Ramin et al. |
| 2013/0181834 A1 | 7/2013 | Bentley et al. |
| 2014/0066088 A1 * | 3/2014 | Bhattacharya ........ H04W 64/00 455/456.1 |
| 2014/0278060 A1 | 9/2014 | Kordari et al. |
| 2015/0046582 A1 | 2/2015 | Gelvin et al. |
| 2015/0091757 A1 | 4/2015 | Shaw et al. |
| 2016/0358440 A1 | 12/2016 | Trivelpiece et al. |
| 2018/0054713 A1 | 2/2018 | South et al. |
| 2018/0279253 A1 * | 9/2018 | Knoblauch ........... H04W 64/00 |
| 2018/0313950 A1 | 11/2018 | Mohamadi |
| 2019/0318611 A1 | 10/2019 | Gravel et al. |

OTHER PUBLICATIONS

International Bureau of WIPO; "International Preliminary Report on Patentability" dated Dec. 15, 2020; PCT Application No. PCT/US19/37365 filed Jun. 14, 2019; pp. 1-6 (2020).

International Bureau of WIPO; "International Search Report & Written Opinion" dated Aug. 29, 2019; PCT Application No. PCT/US19/37365 filed Jun. 14, 2019; pp. 1-7 (2019).

* cited by examiner

IN-BUILDING TRACKING SYSTEM FOR DISTRIBUTED ANTENNA SYSTEMS

CROSS-REFERENCE TO RELATED APPLICATIONS

The present application is a continuation of U.S. Non-Provisional application Ser. No. 17/071,413, filed Oct. 15, 2020, and entitled "IN-BUILDING TRACKING SYSTEM FOR DISTRIBUTED ANTENNA SYSTEMS," which is a continuation of U.S. Non-Provisional application Ser. No. 16/442,376, filed Jun. 14, 2019, and entitled "IN-BUILDING TRACKING SYSTEM FOR DISTRIBUTED ANTENNA SYSTEMS," claims the benefit of U.S. Provisional Application No. 62/684,978, filed Jun. 14, 2018, and entitled "IN-BUILDING TRACKING SYSTEM FOR DISTRIBUTED ANTENNA SYSTEMS," the entire contents of each which are incorporated herein in their entirety for all purposes.

TECHNICAL FIELD

The subject matter described herein relates to in-building tracking systems, and more particularly to a tracking system for a distributed antenna system.

BACKGROUND

Many buildings today include systems that enhance the wireless communications within the building, particularly for first responders. A first responder is a person with specialized training who is among the first to arrive to an environment, such as a building, that is in need of assistance or is experiencing an emergency, such as an accident, natural disaster, or terrorist attack. First responders typically include paramedics, emergency medical technicians (EMTs), police officers, firefighters, rescuers, and other trained members of organizations that respond to emergencies.

Conventionally, all first responders are equipped with a radio or other communication device that can communicate on a dedicated radio frequency (RF) communication network, or other wireless networks. These networks can be RF repeater type systems, Distributed Antenna Systems (DASs), small cells, and other systems. The types of wireless signals that may be enhanced using these types of systems include cellular systems, WIFI systems, and public safety systems. Some of these systems, especially public safety systems, are being deployed more frequently as fire code requirements, or other health and safety ordinances, become more stringent.

One key requirement for the safety of a first responder when attending to in-building emergencies is the ability to determine a location of the first responder within the building. Several systems exist today to perform such function, such as Bluetooth Low Energy (BLE) beacons, or the like. However, not all first responders carry such beacons or location systems with them at all times. Therefore, a need exists to identify the location of a first responder within a particular building without the use of special location-determination systems.

SUMMARY

A system and method are provided to determine a position in a building of a first responder, based on radio activity of a radio associated with the first responder. In one aspect, a system for determining a position of a first responder in a building, where the first responder is using a radio, includes a number of antennas, distributed geographically within the building. Each of the antennas includes a level detector to detect and measure a strength of an input signal from the radio of the first responder to produce a level signal. Each antenna further includes a time tagger to tag the detected input signal with a timing signal, and a communication module to transmit the level signal and timing signal to a signal distribution network, which is configured to communicate the level signal and timing signal associated with each of the plurality of antennas from the communication module. The system further includes a sensor processor configured to receive the signal level and timing signal from the signal distribution network of each of the plurality of antennas, to determine the position of the radio relative to each of the plurality of antennas according to the level signal and timing signal.

In other aspects, a method of determining a position of a first responder in a building, where the first responder is using a radio, is presented. The building includes a distributed antenna system, as described herein. The method includes the steps of detecting, by one or more antennas of a plurality of antennas of the distributed antenna system, in an input signal from the radio, and measuring, by a level detector associated with each of the one or more antennas, a strength of an input signal of the radio of the first responder to produce a level signal. The method further includes tagging, by a time tagger associated with each of the one or more antennas, the detected input signal with a timing signal. The method further includes transmitting, by a communication module associated with each of the one or more antennas, the level signal and timing signal to a signal distribution network of the distributed antenna system. The method further includes determining, by a sensor processor associated with the distributed antenna system, the position of the radio relative to each of the plurality of antennas according to the level signal and timing signal.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
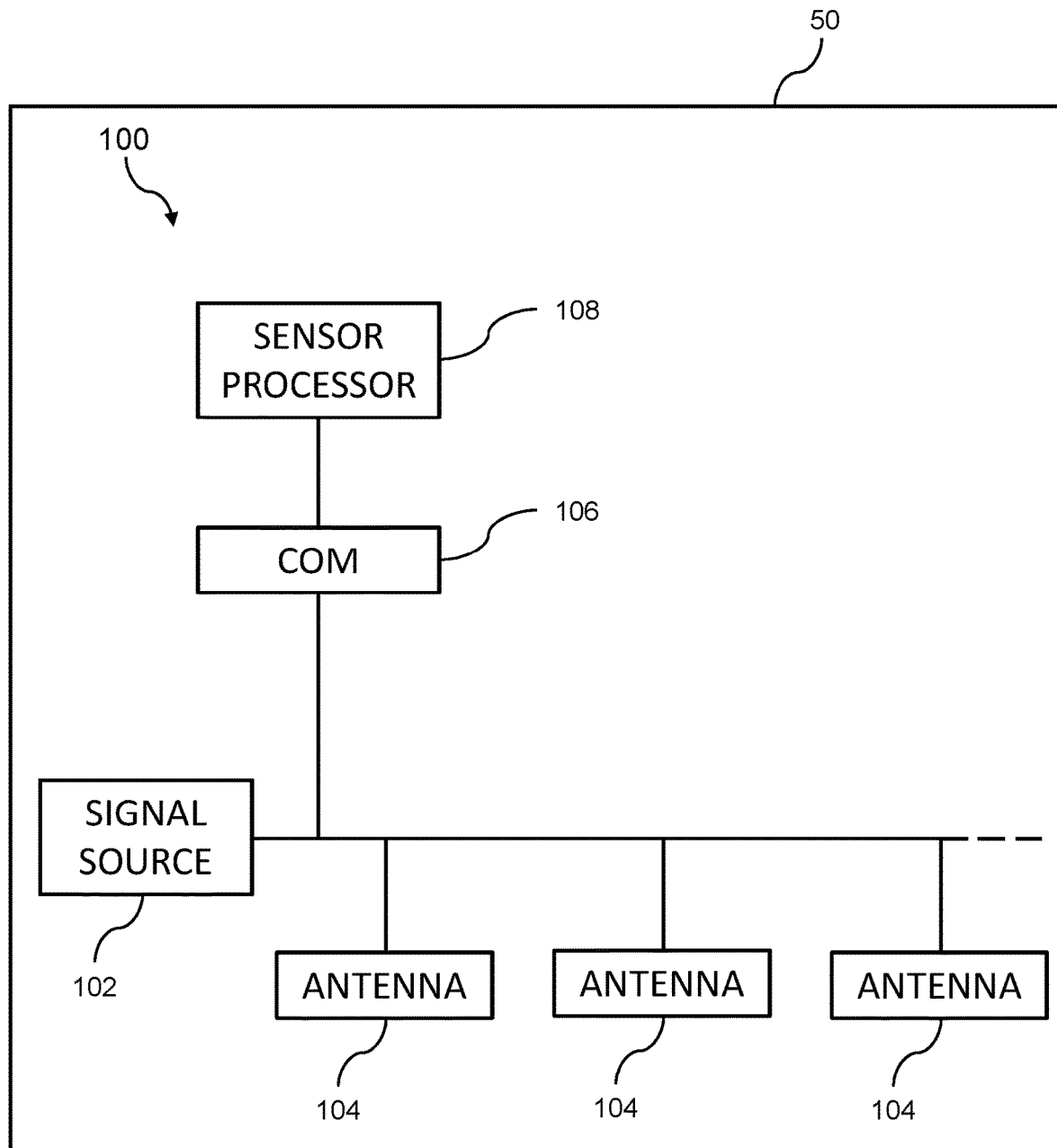
FIG. 1A shows a system consistent with implementations of the current subject matter.

This document describes a system and method to determine or track a position or location in a building of a first responder, based on radio activity of a radio associated with the first responder. FIG. 1A illustrates an in-building tracking system 100, using one or more distributed antenna systems. In some implementations, the tracking system 100 can be used to track multiple first responders, to identify their location, track their movement (based on time tags), or even identify the first responder is relation to the building. In some implementations, a distributed antenna system for communicating with first responder radios can be a Public Safety Distributed Antenna System (Public Safety DAS).

The tracking system 100 includes a signal source 102 for transmission of signals on a number of antennas 104 that are distributed throughout a building, which can be an office building, and apartment building, or the like, and which are each configured to receive transmissions from a radio associated with a first responder. The antennas 104 can be spaced apart in the building, located on different floors or rooms of the building, positioned within certain zones of the building, i.e. quadrants, or the like.

The tracking system includes a communication module 106 that is coupled with each of the antennas 104 via a signal distribution network. The signal distribution network can be any common physical or even wireless medium. Preferably, the signal distribution network uses a physical mesh networking technology, such as ZigBee or Bluetooth Low Energy (BLE), and is further coupled (physically or communicatively) a sensor processor 108. The sensor processor 108 can be implemented as a hardware processor, such as an integrated circuit, as a software application being executed by an operating system, as firmware, or as any combination thereof.

Each antenna 104 includes an integrated system that can measure the input signal strength from a first responder radio, particularly when the radio is used in talk mode, but in other modes as well. This signal level measurement is then tagged with a timing signal and this timing signal is common between all antennas in the system. The signal level and timing information are then transmitted to the sensor processor 108.

Figure 1B:
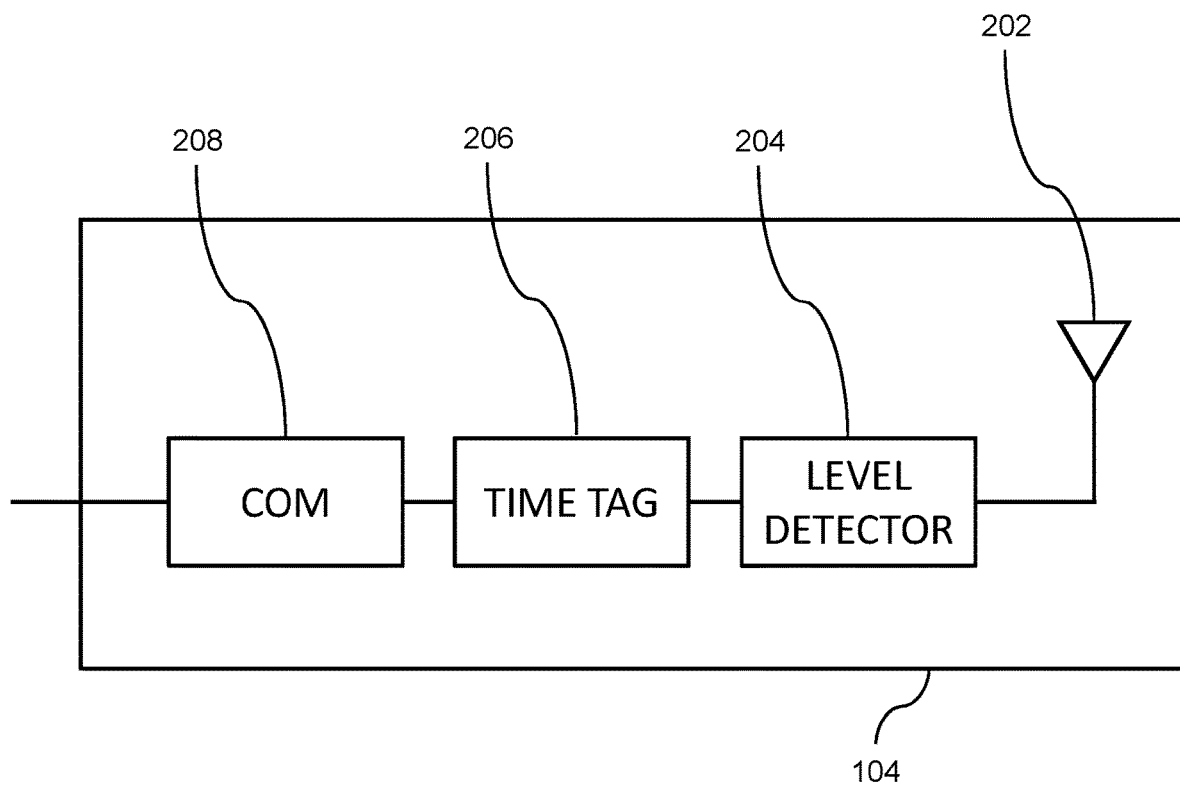
FIG. 1B shows an antenna of a distributed antenna system, consistent with implementations of the current subject matter.

As shown in FIG. 1B, each antenna 104 of the distributed antenna system of the tracking system 100 includes a transmission antenna 202 for sending and receiving signals, such as to and from a radio associated with a first responder. Each antenna 104 further includes a level detector 204 to detect and measure a strength of an input signal from the radio of the first responder to produce a level signal, and a time tagger 206 to tag the detected input signal with a timing signal. Each antenna 104 further includes a communication module 208 to format and transmit both the level signal and timing signal to the signal distribution network. These signals can be encrypted as well by the communication module 208, and decrypted by communication module 106.

Figure 2:
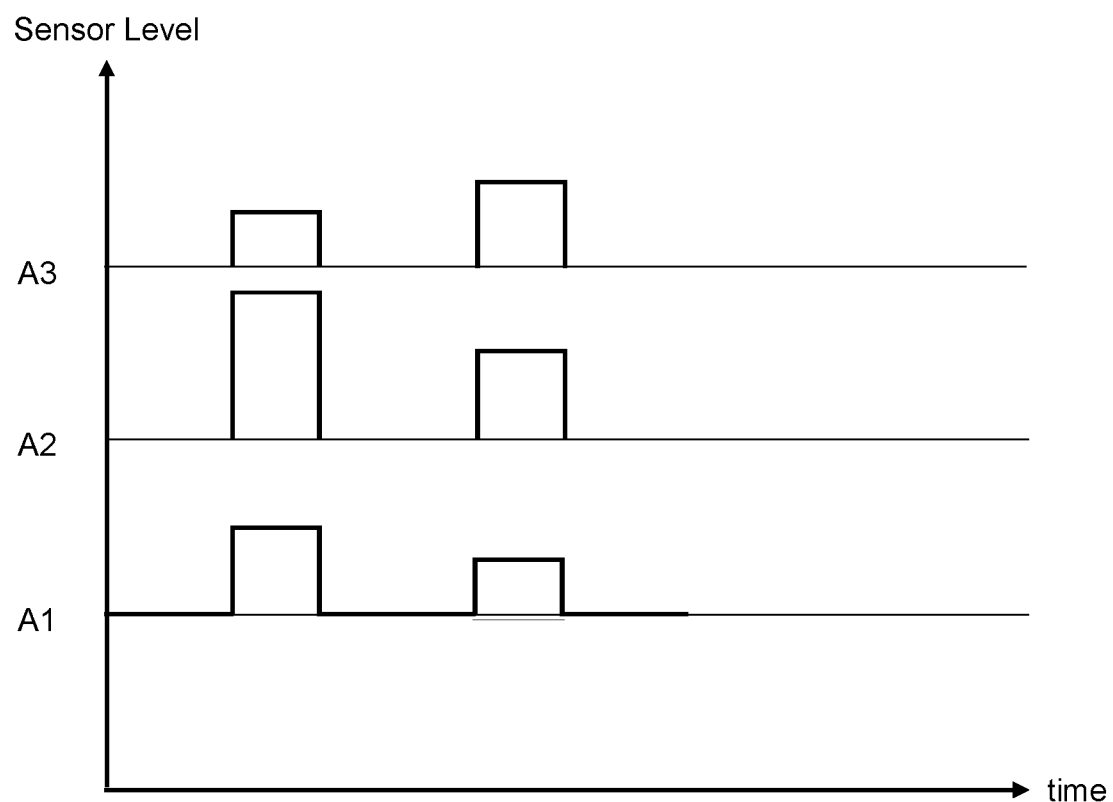
FIG. 2 shows a signal level versus a time received at a processing node, consistent with implementations of the current subject matter.

At the processing node, the level signals can be time-aligned to show the strength level at which a transmission has been received at a particular antenna 104. By using location techniques such as triangulation, i.e. using relative signal strength between three of the antennas, an approximate position of a first responder can be determined. FIG. 2 shows the information received by the sensor processor 108.

Accordingly, in some implementations, a location and tracking system is provided that comprises three or more antennas that detect signals from radios in the uplink direction, and tags the signals with timing information that is common to all the antennas in the system. The input signals can be filtered to isolate individual operating channels within a frequency band of operation. Multiple filters can be used to enable multiple level detections and time tag operations to be performed in parallel.

The antennas form part of a distributed antenna system and is also used to provide wireless signal coverage in the downlink direction. The signal levels and time tags are sent to the sensor processor.

Figure 3:
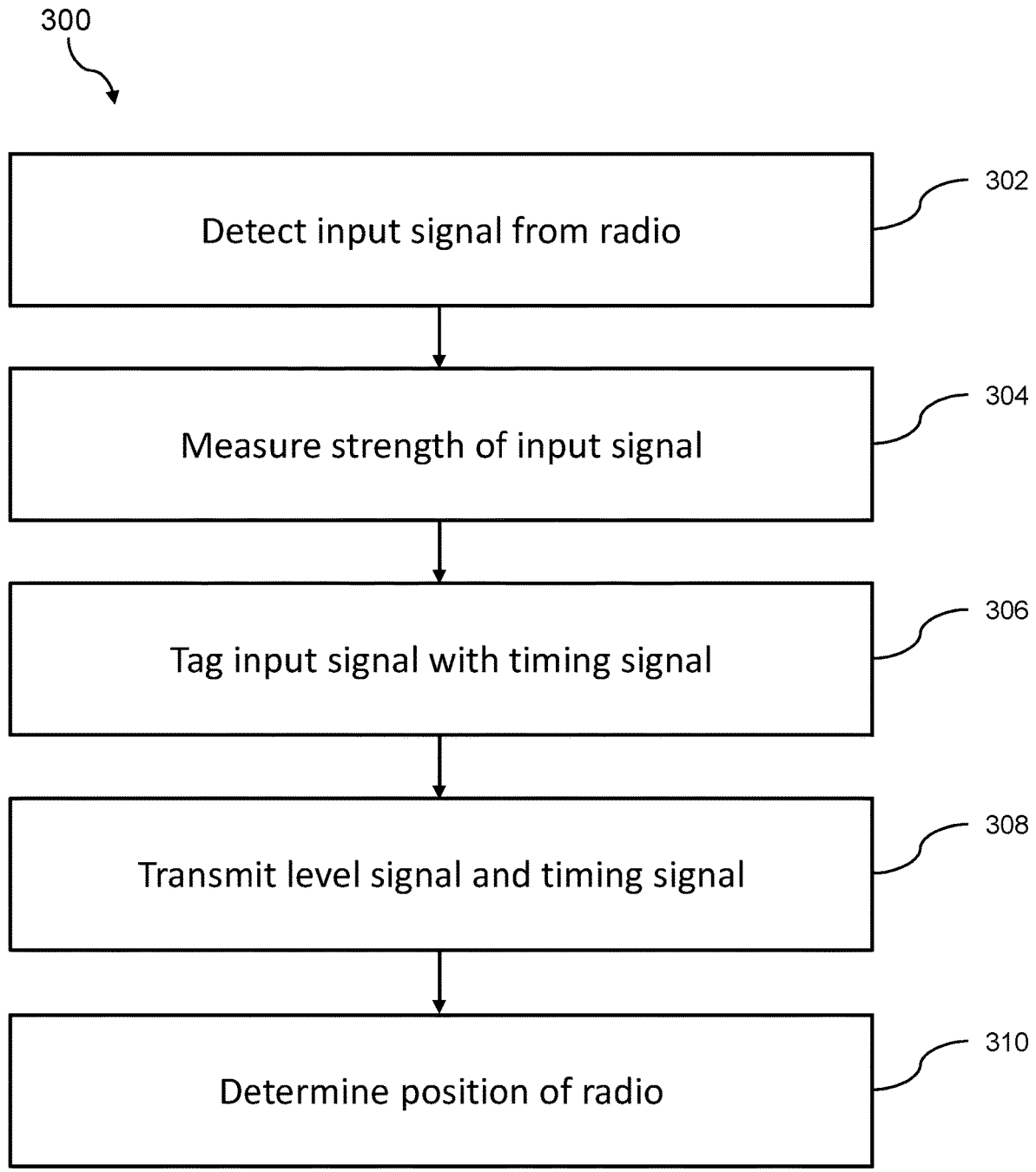
FIG. 3 is a flowchart of a method of determining a position of a first responder in a building, where the first responder is using a radio.

FIG. 3 is a flowchart illustrating a method 300 of determining a position of a first responder in a building, where the first responder is using a radio, the building having a distributed antenna system. At 302, one or more antennas of a plurality of antennas of the distributed antenna system, detects an input signal from the radio. At 304, a level detector associated with each of the one or more antennas measures a strength of an input signal of the radio of the first responder to produce a level signal. At 306, a time tagger associated with each of the one or more antennas tags the detected input signal with a timing signal. At 308, communication module associated with each of the one or more antennas transmits the level signal and timing signal to a signal distribution network of the distributed antenna system. At 310, a sensor processor associated with the distributed antenna system determines the position of the radio relative to each of the plurality of antennas according to the level signal and timing signal.

In some implementations, a system as described herein can be used to define an SOS transmission pattern. Such a pattern can be, for example, keying the radio five times within 5 seconds or other such time interval. In yet other implementations, the system can include a processing mechanism or device to analyze the detected signal levels and timing information to detect if the SOS pattern is present, and the system can include a means of alerting of such an event. The signal level detected is the total input power, commonly referred to as Received Signal Strength Indicator (RSSI). Alternatively, the signal level detected is not the total input power or RSSI, but a subset of the signal power such as the pilot channel power, pilot symbol power or traffic channel power, for example.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for determining a position of a first responder in a building, where the first responder is associated with a radio, the system comprising:
    a plurality of antennas placed within the building, each of the plurality of antennas configured to detect an input signal from the radio of the first responder, a time tagger to tag the detected input signal with a timing signal, and a communication module to encrypt a representation of the detected input signal and the timing signal, and to transmit a representation of the encrypted and detected input signal and the timing signal;
    a signal distribution network configured to communicate, via a communication network, the representation of the encrypted and detected input signal and the timing signal associated with each of the plurality of antennas from the communication module; and
    a sensor processor configured to receive a signal level and timing signal from the signal distribution network of each of the plurality of antennas, and to time-align detected input signals by two or more of the plurality of antennas to determine the position of the radio of the first responder relative to each of the two or more of the plurality of antennas according to the level signal of each detected input signal.

2. The system in accordance with claim 1, wherein the timing signal is common between each of the at least three antennas.

3. The system in accordance with claim 1, wherein the sensor processor is further configured to detect a presence of a predetermined SOS signal in the input signal.

4. The system in accordance with claim 3, wherein the sensor processor is further configured to generate an alert if the predetermined SOS signal in the input signal is present.

5. The system in accordance with claim 1, wherein the sensor processor is further configured to time-align detected signal levels of the at least three antennas to determine a position of the radio.

6. The system in accordance with claim 1, wherein the communication network uses a physical mesh networking communication standard to communicate the level signal and the timing signal associated with each of the at least three antennas from the communication module.

* * * * *